US009738251B2

United States Patent
Odate

(10) Patent No.: US 9,738,251 B2
(45) Date of Patent: Aug. 22, 2017

(54) SEAT BELT DEVICE

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/801,951

(22) Filed: Jul. 17, 2015

(65) Prior Publication Data

US 2016/0023632 A1 Jan. 28, 2016

(30) Foreign Application Priority Data

Jul. 24, 2014 (JP) .................................. 2014-150973

(51) Int. Cl.
*B60R 22/46* (2006.01)
*B60R 21/0134* (2006.01)
*B60R 21/01* (2006.01)

(52) U.S. Cl.
CPC .......... *B60R 22/46* (2013.01); *B60R 21/0134* (2013.01); *B60R 2021/01013* (2013.01); *B60R 2021/01122* (2013.01); *B60R 2021/01272* (2013.01); *B60R 2022/4666* (2013.01)

(58) Field of Classification Search
CPC .................................................... B60R 22/46
See application file for complete search history.

(56) References Cited

U.S. PATENT DOCUMENTS 6,385,517 B1 * 5/2002 Kore ...................... B60N 2/002
  180/271
7,159,478 B2 * 1/2007 Schubert ................ B60R 22/00
  73/865.9
7,605,711 B2 * 10/2009 Yasunori ................ B60N 2/002
  340/573.1

(Continued)

FOREIGN PATENT DOCUMENTS

JP    2004-217057 A    8/2004
JP    2007-118763 A    5/2007

(Continued)

OTHER PUBLICATIONS

Office Action dated Apr. 13, 2016, issued in counterpart Japanese Patent Application No. 2014-150973, with English translation. (6 pages).

*Primary Examiner* — Angela Ortiz
*Assistant Examiner* — Michael Berns
(74) *Attorney, Agent, or Firm* — Westerman, Hattori, Daniels & Adrian, LLP

(57) ABSTRACT

A seat belt device includes: a belt reel that winds a webbing; an electric motor that drives the belt reel to wind; a collision prediction unit that predicts a collision with an object; and a controller that is connected to the collision prediction unit via a network and that performs winding control of the electric motor when a collision with the object is predicted by the collision prediction unit. After the controller receives information on collision prediction from the collision prediction unit via the network, even when a communication failure occurs between the controller and the collision prediction unit, the controller performs control to cause the electric motor to continue winding control.

2 Claims, 4 Drawing Sheets

(56) References Cited

U.S. PATENT DOCUMENTS

| | | | |
|---|---|---|---|
| 7,712,784 B2* | 5/2010 | Ishii | B60R 22/46 |
| | | | 180/268 |
| 7,942,448 B2* | 5/2011 | Odate | B60R 22/1951 |
| | | | 280/806 |
| 2005/0288829 A1* | 12/2005 | Sakai | B60R 21/0152 |
| | | | 701/1 |
| 2007/0194565 A1* | 8/2007 | Clute | B60R 22/19 |
| | | | 280/806 |
| 2008/0054618 A1* | 3/2008 | Ishii | B60R 22/46 |
| | | | 280/807 |

FOREIGN PATENT DOCUMENTS

| | | |
|---|---|---|
| JP | 2008-056075 A | 3/2008 |
| JP | 2014-034221 A | 2/2014 |

* cited by examiner

SEAT BELT DEVICE

CROSS REFERENCES TO RELATED APPLICATIONS

The present application claims priority under 35 U.S.C. § 119 to Japanese Patent Application No. 2014-150973, filed Jul. 24, 2014, entitled "Seat Belt Device." The contents of this application are incorporated herein by reference in their entirety.

BACKGROUND

1. Field

The present disclosure relates to a seat belt device.

2. Description of the Related Art

For instance, Japanese Unexamined Patent Application Publication (JP-A) No. 2014-34221 discloses a technology for a motor control device and a seat belt device, the motor control device being capable of avoiding an increase of dark current without adding a component such as a relay even when a failure occurs in a switching element included in a motor drive circuit, the seat belt device utilizing the motor control device for winding drive control of a belt reel.

According to the technology disclosed in JP-A No. 2014-34221, when a failure occurs in a switching element, the winding drive of the belt reel is stopped. For this reason, there is a problem in that a proper restraining force may not be applied to an occupant in the case of a high emergency level such as an occurrence of a collision.

SUMMARY

The present disclosure has been made to solve the above-mentioned problem and provides a seat belt device that is capable of applying a restraining force to an occupant properly regardless of the type of error even in the case of a high emergency level.

A first aspect of the present disclosure provides a seat belt device including: a belt reel that winds a webbing; an electric motor that drives the belt reel to wind; a collision predictor that predicts a collision with an object to generate a pre-collision signal; and a controller that is connected to the collision predictor via a network and that starts and performs winding control of the electric motor when a collision with the object is predicted by the collision predictor. After the controller receives information on collision prediction including the pre-collision signal from the collision predictor via the network, even when a communication failure occurs between the controller and the collision predictor, the controller performs control to cause the electric motor to continue winding control.

A second aspect of the present disclosure provides the seat belt device according to the first aspect that further includes an anomaly detector that detects an occurrence of anomaly in a signal line that connects between the controller and the electric motor. After the controller receives information on collision prediction from the collision predictor via the network, in the case where an anomaly is detected by the anomaly detector, the controller performs control to stop winding drive of the belt reel.

DESCRIPTION OF THE PREFERRED EMBODIMENTS

Hereinafter, a seat belt device 10 according to an embodiment of the present disclosure (hereinafter, simply referred to as the present embodiment) will be described in detail with reference to the accompanying drawings.

(Configuration of Embodiment)

Figure 1:
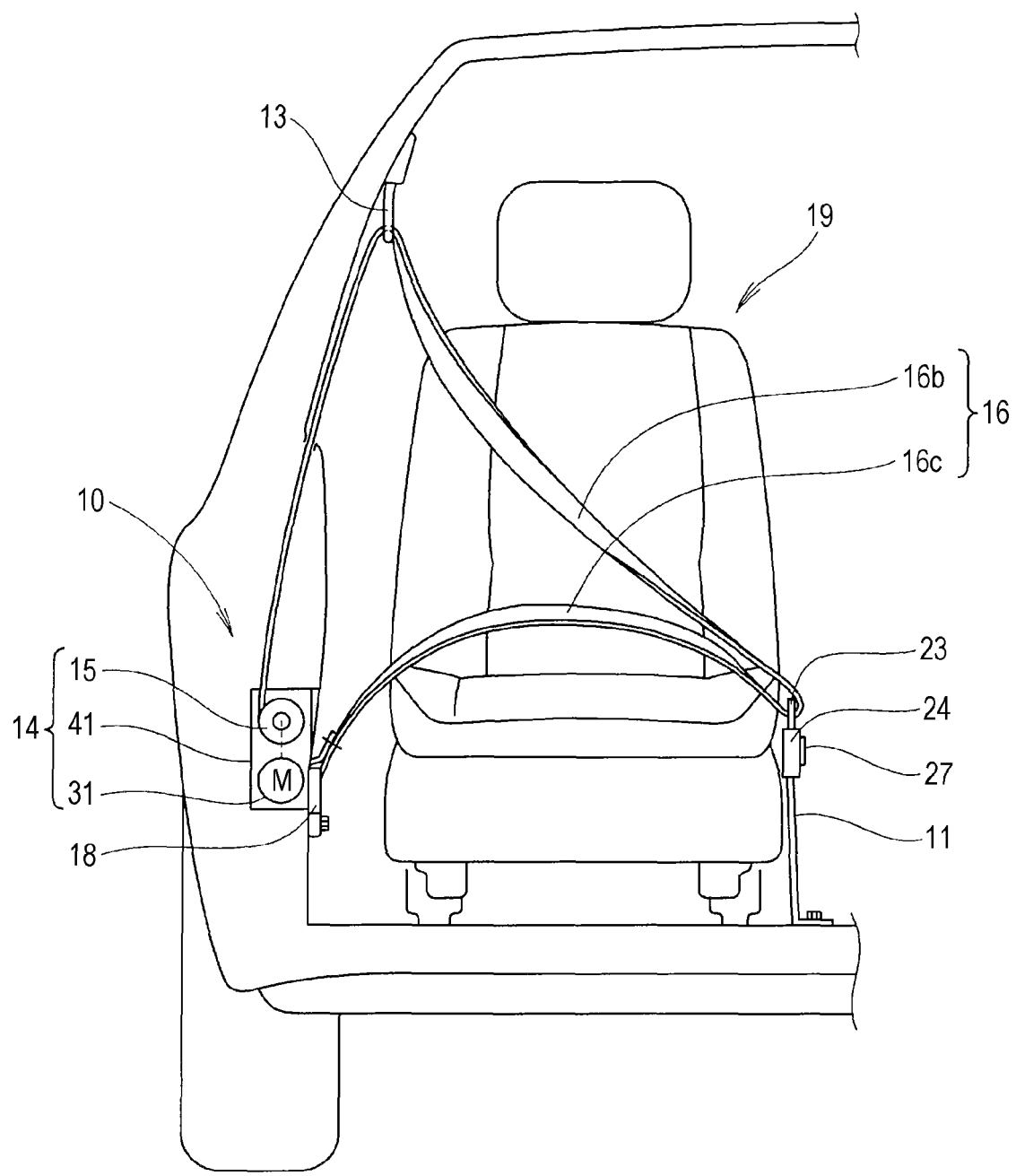
FIG. 1 is a front view illustrating a wearing state of a seat belt device according to an embodiment of the present disclosure.

The configuration of the seat belt device 10 according to the present embodiment will be described with reference to FIG. 1. FIG. 1 illustrates an exemplary configuration that includes the seat belt device 10 so that an occupant seated on a seat 19 provided in a vehicle is properly restrained. Although only the driver seat side is illustrated here, the passenger seat side of the vehicle is also provided with the seat belt device 10. The seat belt device 10 is capable of winding a webbing 16 by a retractor 14 which is provided in a side portion of the vehicle body, the webbing 16 being designed to restrain a shoulder and the waist of the occupant at the same time.

The seat belt device 10 performs winding control of the webbing 16 by the later-described pretensioner unit 50R (FIG. 2) that controls the amount of current flow to an electric motor 31. Specifically, the webbing 16 is wound by rotation of a belt reel 15, the rotation being controlled by current feedback so that the value of drive current of the electric motor 31 is equal to the value of current that allows a predetermined tension to be applied to the webbing 16.

The seat belt device 10 has a configuration of three-point support system in which the webbing 16 is supported by three anchors: an upper anchor 13, a center anchor 11, and a lower anchor 18. The upper anchor 13 is provided in an upper portion of a side of the vehicle body. The center anchor 11 is provided in a lower portion of the side of a seat 19, that is opposite to the upper anchor 13. The lower anchor 18 is provided below the upper anchor 13 of the seat 19.

The webbing 16 includes a shoulder belt 16b that restrains a shoulder of an occupant and a lap belt 16c that restrains the waist of the occupant. There is mounted a tongue 23 between the shoulder belt 16b and the lap belt 16c (a folded portion of the webbing 16). The tongue 23 is removably attached to a buckle 24 by one-touch operation, the buckle 24 being fixed to the center anchor 11.

A buckle switch 27 is built in the buckle 24. The buckle switch 27 outputs an ON signal when the tongue 23 is attached to the buckle 24 and outputs an OFF signal when the tongue 23 is removed from the buckle 24.

Figure 2:
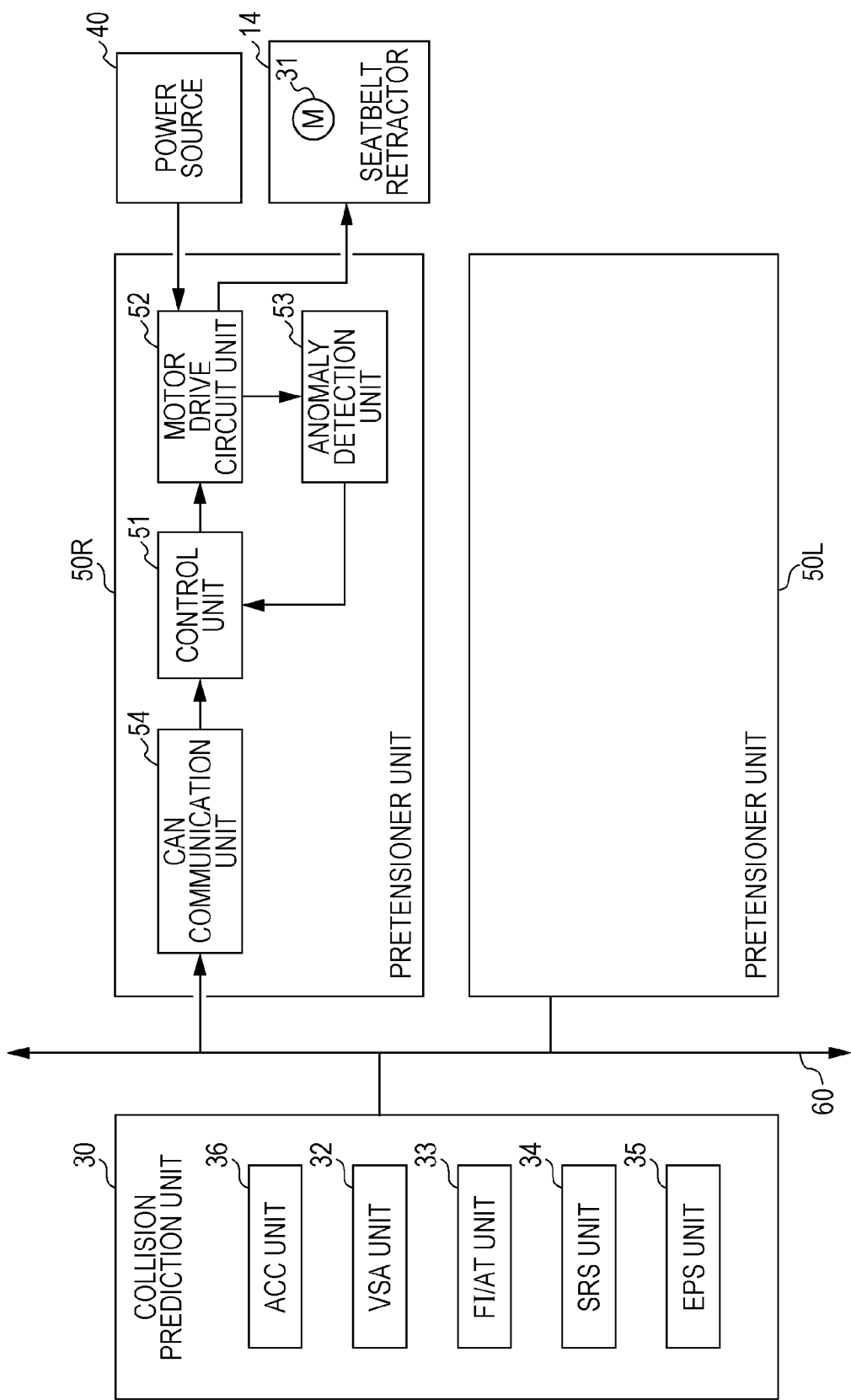
FIG. 2 is a block diagram illustrating the configuration of a control system of the seat belt device according to the embodiment of the present disclosure.

Next, the control system of the seat belt device 10 according to the present embodiment will be described with reference to FIG. 2. Here, the pretensioner unit 50R of the right side seat will be described as an example. Because the pretensioner unit 50L of the left side seat also has the same configuration, description thereof is omitted to avoid redundancy.

The pretensioner unit 50R includes electronic control units (ECUs) and operates upon receiving power from an in-vehicle battery (power source 40). Specifically the pretensioner unit 50R includes a control unit 51 (a controller), a motor drive circuit unit 52, an anomaly detection unit 53 (an anomaly detector), and a control area network (CAN) communication unit 54.

The CAN communication unit 54 is a communication interface that is connected to a collision prediction unit (a collision predictor) 30 via a CAN bus 60 that serves as a data transmission line for an in-vehicle local area network (LAN). As the collision 30, there are illustrated ECUs such as an adaptive cruise control (ACC) unit 36 (control unit for an object detector as an example), a vehicle stability assist (VSA) unit 32, a fuel injection/automatic transmission (FI/AT) unit 33, a supplement restraint system (SRS) unit 34, an electric power steering (EPS) unit 35. Mutual communication of relevant information is performed between those units and the pretensioner unit 50R via the CAN bus 60, via which the pre-collision signal generated by the collision prediction unit 30 is transmitted to the control unit 51.

The control unit 51 calculates the amount of current flow to the electric motor 31 built in the retractor 14 based on the information inputted from the CAN communication unit 54, the motor drive circuit unit 52, and the anomaly detection unit 53, and generates a control signal to the electric motor 31, then outputs the control signal to the motor drive circuit unit 52. In addition, when a collision with an object is predicted by the collision prediction unit 30, the control unit 51 performs winding control of the electric motor 31. At this point, after the control unit 51 receives information on collision prediction from the collision prediction unit 30 via the CAN communication unit 54, even when a communication failure occurs between the control unit 51 and the collision prediction unit 30, the control unit 51 performs control to cause the electric motor 31 to continue the winding control.

The anomaly detection unit 53 detects an anomaly in a signal line and outputs the detected anomaly to the control unit 51, the signal line connecting the control unit 51 and the electric motor 31. After the control unit 51 receives information on collision prediction from the collision prediction unit 30 via the CAN communication unit 54, in the case where an anomaly is detected by the anomaly detection unit 53, the control unit 51 performs control to stop winding drive of the belt reel 15.

(Operation of Embodiment)

Hereinafter, the operation of the control system of the seat belt device 10 illustrated in FIG. 2 will be described in detail with reference to the flow chart of FIG. 3 and the operation conceptual diagrams of FIGS. 4A and 4B.

Figure 3:
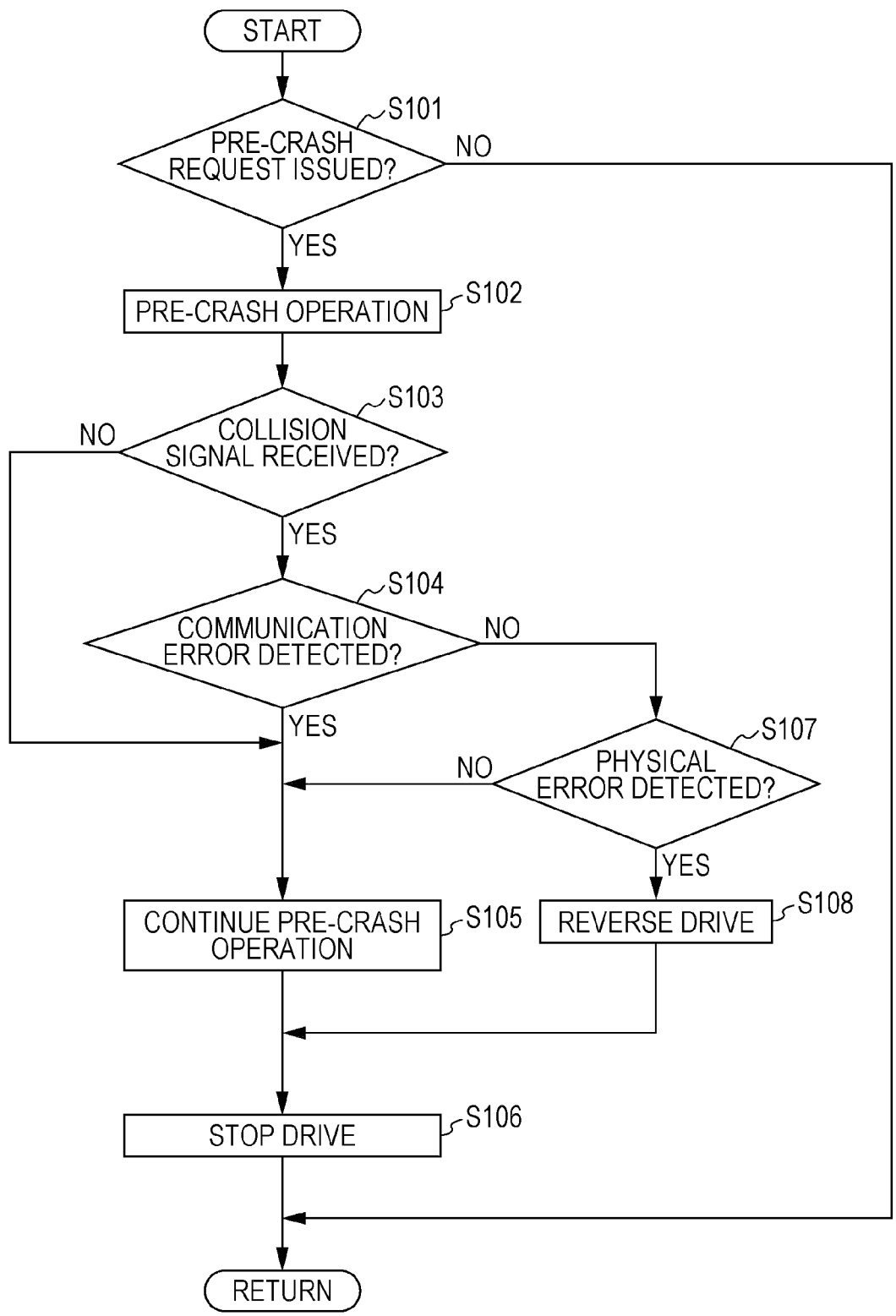
FIG. 3 is a flow chart illustrating the processing operation when an error occurs in the seat belt device according to the embodiment of the present disclosure.

Referring to FIG. 3 the motor drive circuit unit 52 controls the amount and direction of current that flows through the electric motor 31 connected via an I/O terminal, by pulse width modulation (PWM) control by the control unit 51. In this condition, the control unit 51 first determines whether or not pre-crash is observed (step S101). For instance, when a pre-crash request due to a brake assisting operation or a sudden turn of the steering is received via the CAN bus 60 from the collision prediction unit 30 such as the VSA unit 32 or the EPS unit 35 ("YES" in step S101), the control unit 51 performs pre-crash operation accordingly to each of the units (step S102). The pre-crash operation herein refers to an operation of collision avoidance when the vehicle experiences an acceleration greater than or equal to a predetermined value, or impact reduction in case of a collision.

Next, for instance, when a pre-collision signal is received from the collision prediction unit 30 such as the SRS unit 34 ("YES" in step S103), the control unit 51 determines whether or not a system failure interfering with safety seat belt control has occurred. Specifically, first, it is determined whether or not a communication error has occurred (step S104). The communication error herein refers to an error based on data reliability determination using an error detection code such as a checksum or an alive counter. FIG. 4A illustrates an example of determination of a communication error using a checksum.

Figure 4A:
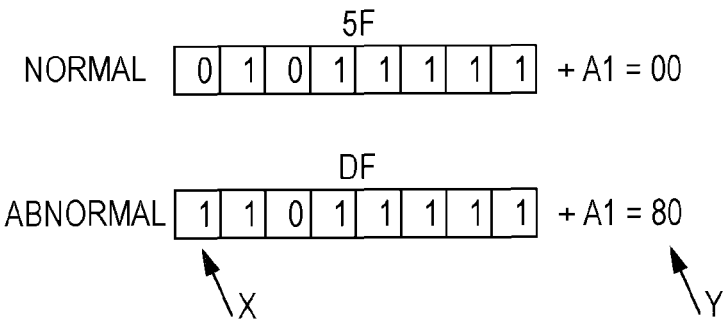
FIGS. 4A and 4B illustrate operation conceptual diagrams when an error occurs in the seat belt device according to the embodiment of the present disclosure.

Checksum is a technique for identifying a communication error when data is transmitted and received, where the data to be transmitted is divided into blocks and data in each block, for instance, "5F" illustrated in FIG. 4A is summed up as a numerical value and the numerical sum "A1" is transmitted simultaneously with the data "5F". The receiving side then identifies whether transmission and reception of the data is successful. In the case where the most significant bit X of a block is inverted due to noise or the like and the data is changed to "DF", "80 (Y)" is received as the checksum "A1" and thus an occurrence of a communication error is detectable by the receiving side. Alive counter is a method in which alive data is transmitted continuously for a certain period and in the case where the alive data is not received even after a non-communication state continues for the certain period or longer, the connection is cut off.

When an occurrence of a communication error (checksum, alive counter) is detected ("YES" in step S104), the control unit 51 continues the pre-crash operation of winding the webbing (step S105), and detects completion of the winding of the seat belt and stops the drive of the electric motor 31 (step S106). Therefore, even when a communication error occurs, the occupant may be restrained continuously. When a per-collision signal is not received in step S103 ("NO" in step S103), determination as to whether or not a system failure interfering with safety seat belt control has occurred is skipped and winding of the webbing is continued (step S105).

On the other hand, when an occurrence of a communication error is not detected ("NO" in step S104), the control unit 51 determines by the anomaly detection unit 53 whether or not an open failure (physical error) due to a disconnection or the like has occurred. As is well known, the motor drive circuit unit 52 includes, for instance, switching elements of Q1, Q2, Q3, Q4, each of which includes a metal oxide semi-conductor field effect transistor (MOSFET). The motor drive circuit unit 52 is constituted by what is called H-bridge circuit in which a high side arm and a low side arm are connected in a bridge form, the high side arm including two high side switching elements Q3, Q4 connected to the positive electrode side terminal of the power source 40 to which power is supplied from the in-vehicle battery, the low side arm including two low side switching elements Q1, Q2 connected to the GND of the power source 40.

Figure 4B:
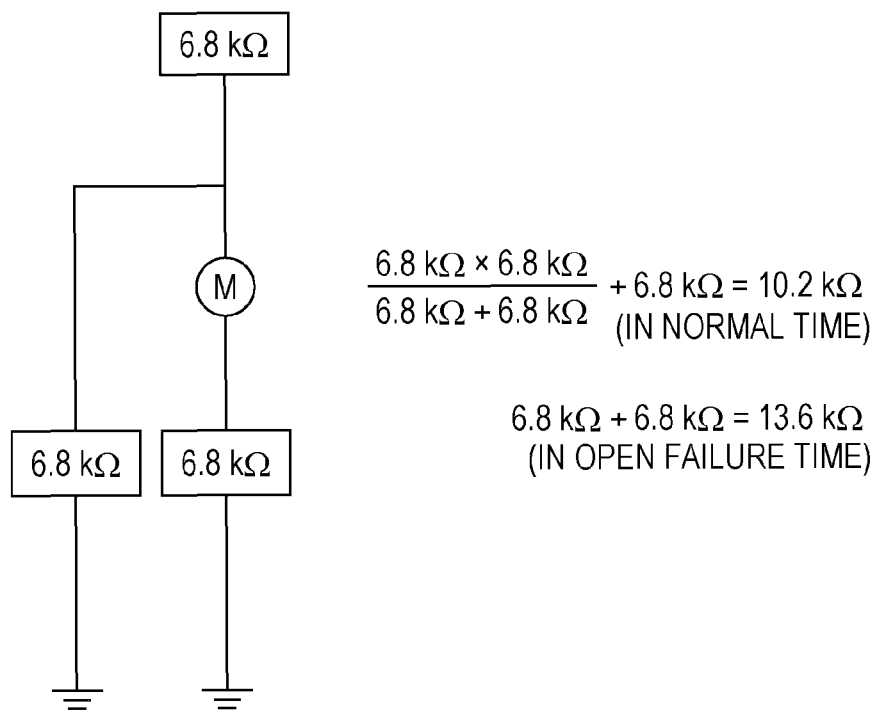

The determination as to whether or not an open failure such as a disconnection has occurred may be made by detecting, for instance, the values of the resistors included in the H bridge as illustrated in FIG. 4B. That is, the combined resistance value of the resistors included in the H bridge is 10.2 [KΩ] in normal time whereas 13.6 [KΩ] in an open failure occurrence time, and thus detection of the combined resistance value by the control unit 51 via the anomaly detection unit 53 enables determination as to whether or not a physical error has occurred. When the anomaly detection unit 53 detects an occurrence of a physical error ("YES" in step S107), the control unit 51 drives the electric motor 31 in reverse to release the clutch in consideration of a temporary connection failure (step S108), and stops the winding control of the seat belt (step S106).

(Effect of Embodiment)

As described above, in the seat belt device 10 according to the present embodiment, after the control unit (pretensioner unit 50R) receives information on collision prediction from the collision prediction unit 30 via the network (the CAN bus 60), even when a communication failure occurs between the control unit and the collision prediction unit 30, the control unit performs control to cause the electric motor 31 to continue winding control. In addition, after the control unit receives information on collision prediction, in the case where an anomaly is detected by the anomaly detection unit 53, the control unit performs control to stop the winding drive of the belt reel.

Thus, for instance, even when a state changes from pre-crash to collision occurrence and a communication error occurs in the CAN bus 60, the occupant may be restrained continuously, and when a disconnection is detected after a collision actually has occurred, a command for reverse operation is issued to release the clutch in consideration of a temporary connection failure, then the winding control of the seat belt is stopped, and thus emission of smoke is avoidable. Consequently, it is possible to provide the seat belt device 10 that is capable of applying a restraining force to an occupant properly regardless of the type of error even in the case of a high emergency level.

What is claimed is:

1. A seat belt device provided to a vehicle, comprising:
   a belt reel that winds a webbing;
   an electric motor that drives the belt reel to wind the webbing in a controlled manner;
   a collision predictor that generates a pre-collision signal when a collision of the vehicle with an object is predicted;
   a controller that is connected to the collision predictor via a network, that is connected to the electric motor, and that is configured to control the electric motor to start the winding of the webbing when the controller receives the pre-collision signal from the collision predictor, and that is configured to determine whether or not a communication error occurs in the network by performing data reliability determination on the pre-collision signal from the collision predictor; and
   an anomaly detector that detects an occurrence of an open failure in a signal line that connects the controller and the electric motor,
   wherein after the controller starts the winding of the webbing upon receiving the pre-collision signal from the collision predictor via the network, even if the communication error in the network is detected based on the data reliability determination, the controller controls the electric motor to continue the winding of the webbing, and
   wherein after the controller starts the winding of the webbing upon receiving the pre-collision signal from the collision predictor via the network, if the anomaly detector detects the occurrence of the open failure, the controller controls the electric motor to stop the winding of the webbing.

2. The seat belt device according to claim 1, further comprising a clutch configured to transmit a driving force of the electric motor to the belt reel, wherein if the anomaly detector detects the occurrence of the open failure after the controller receives the pre-collision signal from the collision predictor via the network, the controller drives the electric motor in reverse to release the clutch and then stops the winding of the webbing.

* * * * *